(12) United States Patent
Nakagawa

(10) Patent No.: US 8,699,045 B2
(45) Date of Patent: Apr. 15, 2014

(54) INFORMATION PROCESSING APPARATUS, INFORMATION PROCESSING METHOD, AND STORAGE MEDIUM

(75) Inventor: Masashi Nakagawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 12/844,699

(22) Filed: Jul. 27, 2010

(65) Prior Publication Data

US 2011/0026079 A1    Feb. 3, 2011

(30) Foreign Application Priority Data

Jul. 30, 2009   (JP) .................................. 2009-178003

(51) Int. Cl.
*G06F 3/12*    (2006.01)
*G06F 7/04*    (2006.01)
*G06F 15/00*   (2006.01)

(52) U.S. Cl.
USPC ....... 358/1.13; 358/1.14; 358/1.15; 358/1.16; 358/1.1; 726/26; 726/27; 726/28; 726/29

(58) Field of Classification Search
USPC .......... 358/1.11–1.18, 1.1, 1.9; 709/220–229, 709/245; 710/8
See application file for complete search history.

(56) References Cited

U.S. PATENT DOCUMENTS

| | | | |
|---|---|---|---|
| 7,167,919 B2* | 1/2007 | Iwamoto et al. | 709/229 |
| 2003/0197887 A1* | 10/2003 | Shenoy et al. | 358/1.15 |
| 2006/0092461 A1* | 5/2006 | Kitada | 358/1.15 |
| 2007/0201083 A1* | 8/2007 | Fukui et al. | 358/1.15 |
| 2008/0165372 A1* | 7/2008 | Yamada et al. | 358/1.4 |

FOREIGN PATENT DOCUMENTS

| | | |
|---|---|---|
| JP | 2003-067157 A | 3/2003 |
| JP | 2005-202723 A | 7/2005 |
| JP | 2007-228442 A | 9/2007 |
| JP | 2008-158965 A | 7/2008 |

* cited by examiner

*Primary Examiner* — Chad Dickerson
(74) *Attorney, Agent, or Firm* — Canon USA, Inc., IP Division

(57) ABSTRACT

An information processing apparatus includes a determination unit configured to determine whether user information has been input to a printing apparatus before a print instruction for printing document data is received, and a transmission unit configured to transmit, when the determination unit determines that the user information has been input to the printing apparatus before the print instruction for printing the document data is received, a print job to the printing apparatus to which the user information has been input.

12 Claims, 16 Drawing Sheets

| PERIOD OF TIME (MINUTE) FROM PRINTER DESIGNATION TIME TO PRINT JOB INPUT | PRINT JOB OUTPUT DESTINATION |
|---|---|
| 0~5 | OUTPUT TO PRINTER |
| 5~10 | OUTPUT TO PRINTER |
| 10~20 | OUTPUT TO PRINTER |
| 20~30 | STORE IN SERVER |
| 30~60 | STORE IN SERVER |
| 60~120 | STORE IN SERVER |
| 120~ | STORE IN SERVER |

FIG. 8

| PERIOD OF TIME (MINUTE) FROM PRINTER DESIGNATION TIME TO PRINT JOB INPUT | PRINT JOB OUTPUT DESTINATION |
|---|---|
| 0~5 | OUTPUT TO PRINTER |
| 5~10 | OUTPUT TO PRINTER |
| 10~20 | OUTPUT TO PRINTER |
| 20~30 | STORE IN SERVER |
| 30~60 | STORE IN SERVER |
| 60~120 | STORE IN SERVER |
| 120~ | STORE IN SERVER |

FIG. 10

| PERIOD OF TIME (MINUTE) FROM PRINTER DESIGNATION TIME TO PRINT JOB INPUT | PRINTING PERIOD OF TIME FOR GREAT VOLUME OF PRINT JOB | | |
|---|---|---|---|
| | LONG 30 MINUTES | MEDIUM 10 TO 30 MINUTES | SHORT 5 TO 10 MINUTES |
| 60 MINUTES | OUTPUT TO PRINTER | OUTPUT TO PRINTER | OUTPUT TO PRINTER |
| 60 MINUTES TO 8 HOURS | OUTPUT TO PRINTER | OUTPUT TO PRINTER | STORE IN SERVER |
| 8 TO 24 HOURS | OUTPUT TO PRINTER | STORE IN SERVER | STORE IN SERVER |
| 24 HOURS | STORE IN SERVER | STORE IN SERVER | STORE IN SERVER |

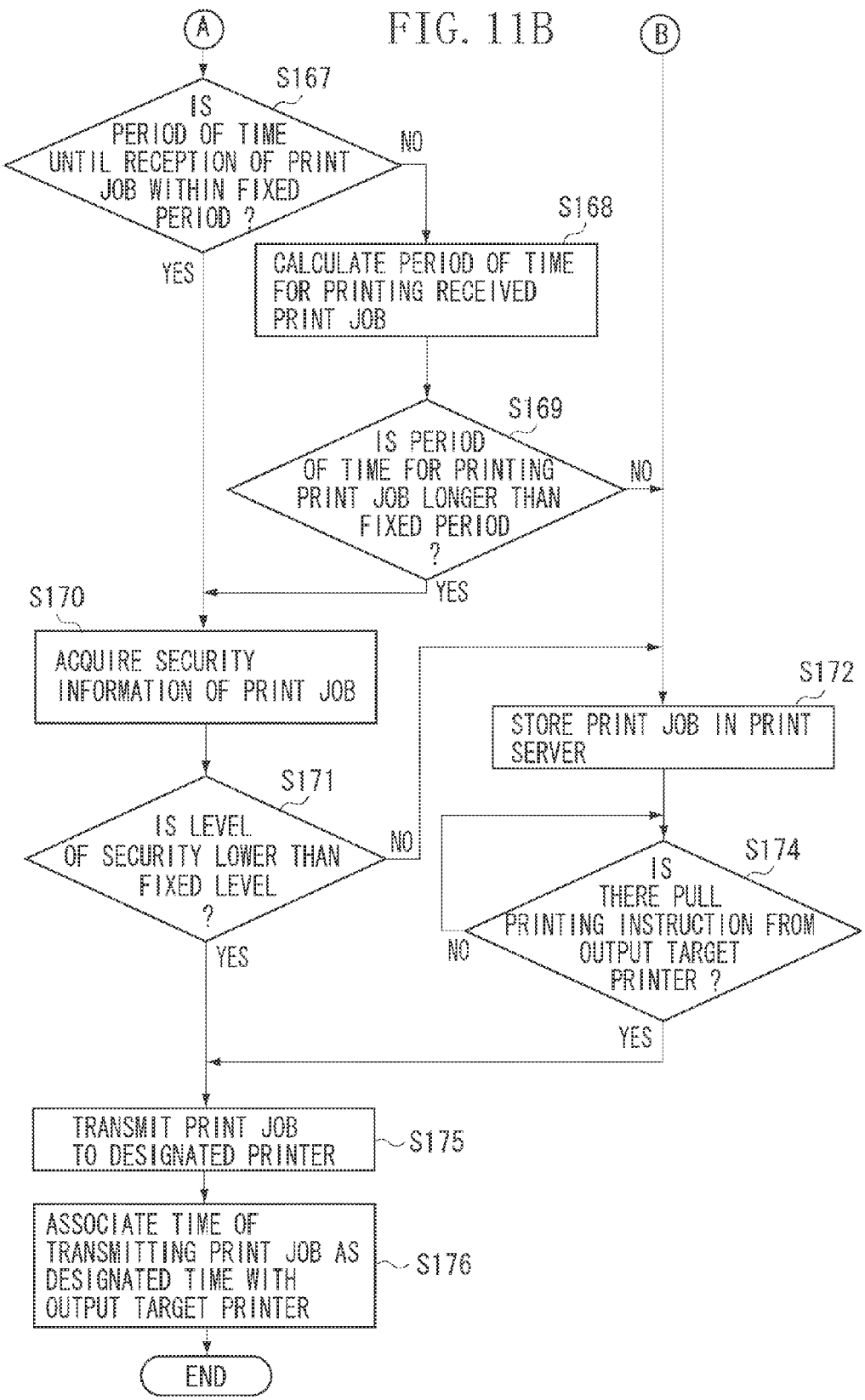

FIG. 12

| PERIOD OF TIME (MINUTE) FROM PRINTER DESIGNATION TIME TO PRINT JOB INPUT | SECURITY LEVEL | | |
|---|---|---|---|
| | HIGH | MIDDLE | LOW |
| 0~5 | OUTPUT TO PRINTER | OUTPUT TO PRINTER | OUTPUT TO PRINTER |
| 5~10 | STORE IN SERVER | OUTPUT TO PRINTER | OUTPUT TO PRINTER |
| 10~20 | STORE IN SERVER | STORE IN SERVER | OUTPUT TO PRINTER |
| 20~30 | STORE IN SERVER | STORE IN SERVER | STORE IN SERVER |
| 30~60 | STORE IN SERVER | STORE IN SERVER | STORE IN SERVER |
| 60~120 | STORE IN SERVER | STORE IN SERVER | STORE IN SERVER |
| 120~ | STORE IN SERVER | STORE IN SERVER | STORE IN SERVER |

FIG. 14

PROPERTY OF...

PAGE SETTING

DOCUMENT SIZE [A4 ▽]

PRINTING DIRECTION  ○ VERTICAL  ● HORIZONTAL

PAGE INTEGRATION [2 PAGER PER PIECE ▽]

TWO-SIDED PRINTING [ONE-SIDED PRINTING ▽]

COLOR/BLACK AND WHITE [COLOR/AUTOMATIC BLACK AND WHITE SWITCHING ▽]

☐ STAMP  [CONFIDENTIAL ▽]  [STAMP EDIT]

☐ OUTPUT JOB ACCORDING TO ARRIVAL TIME AT DEVICE

[OK] [CANCEL] [HELP]

1000
1001

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium.

2. Description of the Related Art

In recent years, there has been further acceleration in unitary management of document data, use of mobile personal computers (PC), and thin-client arrangement. Thus, in such a print environment, a printing data environment must be provided to a client PC without installing any printer driver. One of the problems caused by non-installation of any printer driver is that a user cannot identify an output printer during printing. Selection of a printer driver results in selection of a printer which outputs a print product. However, due to non-installation of any printer driver, the user cannot select a printer driver. No printer driver has accordingly been selected, causing the abovementioned problem.

As an example, Japanese Patent Application Laid-Open No. 2003-067157 discusses a technology which receives a print request from a client PC by a print server, selects an optimal printer on the print server side according to a print status, and outputs a print job.

As another example, Japanese Patent Application Laid-Open No. 2005-202723 discusses a technology which first stores a print job in a print server, and then transmits, when a user operates an operation panel of an output printer to access the print server and designate the print job, the print job from the print server to the printer to print data.

The technology discussed in Japanese Patent Laid-Open No. 2003-067157 has a problem in that the user has no idea about a physical location of an actually used printer while printing can be performed without identifying any output printer. In a mobile environment, when printing is performed at a business trip destination, the user cannot identify a printer which has performed print processing for the print job, losing a print product of the print job.

The technology discussed in Japanese Patent Application Laid-Open No. 2005-202723 always stores the print job first in the print server, and requires the user to go to the output printer, and designate a job of executing printing from the print server (hereinafter referred to as "pull-printing"). More specifically, the user starts printing at the output printer, and hence must wait there until the printing is over. Thus, this method is not suited to printing of a great volume since it takes much time. Even when there is always a fixed printer in a determined output destination, a print task is troublesome because the user must perform a pull-printing operation on the printer side for each printing.

SUMMARY OF THE INVENTION

The present invention is directed to a technology which enables a user to easily find a printing apparatus in a print output destination.

According to an aspect of the present invention, an information processing apparatus includes a determination unit configured to determine whether user information has been input to a printing apparatus before a print instruction for printing document data is received, and a transmission unit configured to transmit, when the determination unit determines that the user information has been input to the printing apparatus before the print instruction for printing the document data is received, a print job to the printing apparatus to which the user information has been input.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of a correspondence table according to the second exemplary embodiment.

FIG. 10 illustrates an example of a correspondence table according to the third exemplary embodiment.

FIG. 12 illustrates an example of a correspondence table according to the fourth exemplary embodiment.

FIG. 14 illustrates an example of a user interface (UI).

DESCRIPTION OF THE EMBODIMENTS

Various exemplary embodiments, features, and aspects of the invention will be described in detail below with reference to the drawings.

A first exemplary embodiment of the present invention will hereinafter be described with reference to the drawings.

Figure 1:
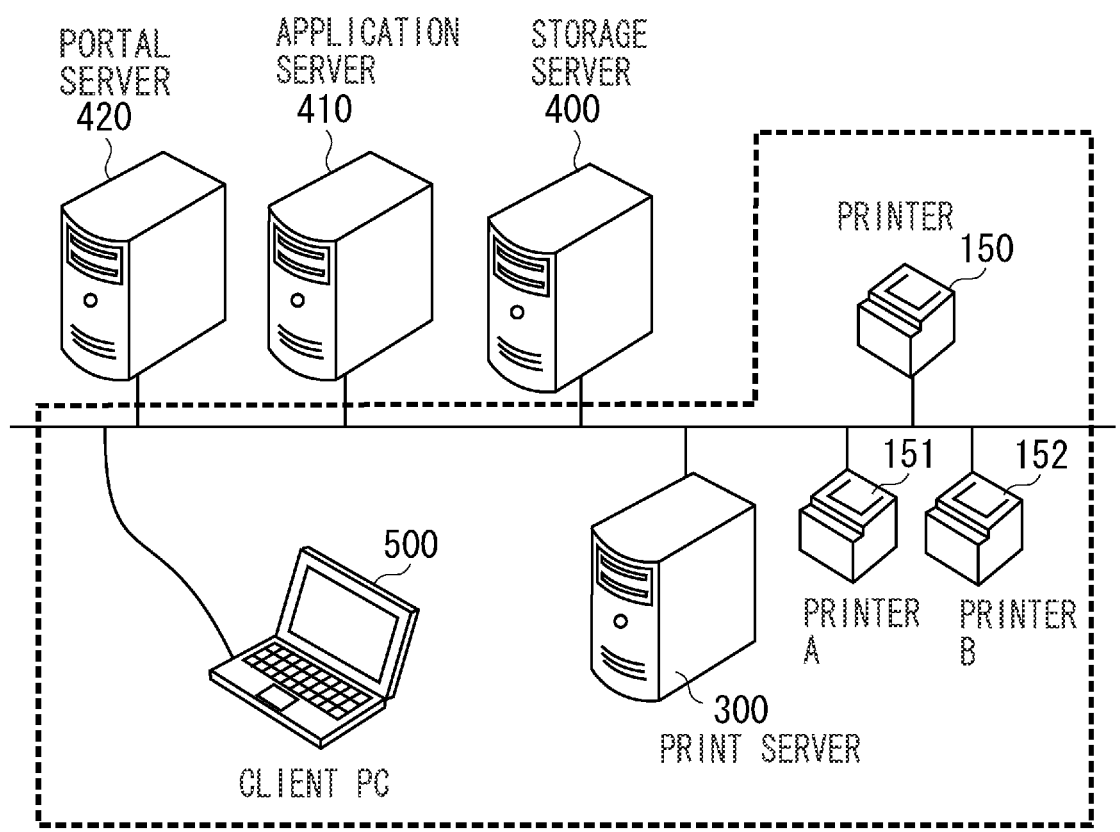
FIG. 1 illustrates an example of a printing system.

FIG. 1 illustrates an example of a configuration of a printing system. The printing system of the present exemplary embodiment includes at least a print server 300, a printer 150, and a client PC 500. A storage server 400 for storing all digital data including document data, and an application server 410 for managing a document generation application are connected to the printing system of the present exemplary embodiment. The printing system of the present exemplary embodiment further includes a portal server 420 for providing a portal site. A printer A 151 and a printer B 152 are connected to the printing system illustrated in FIG. 1.

Figure 2:
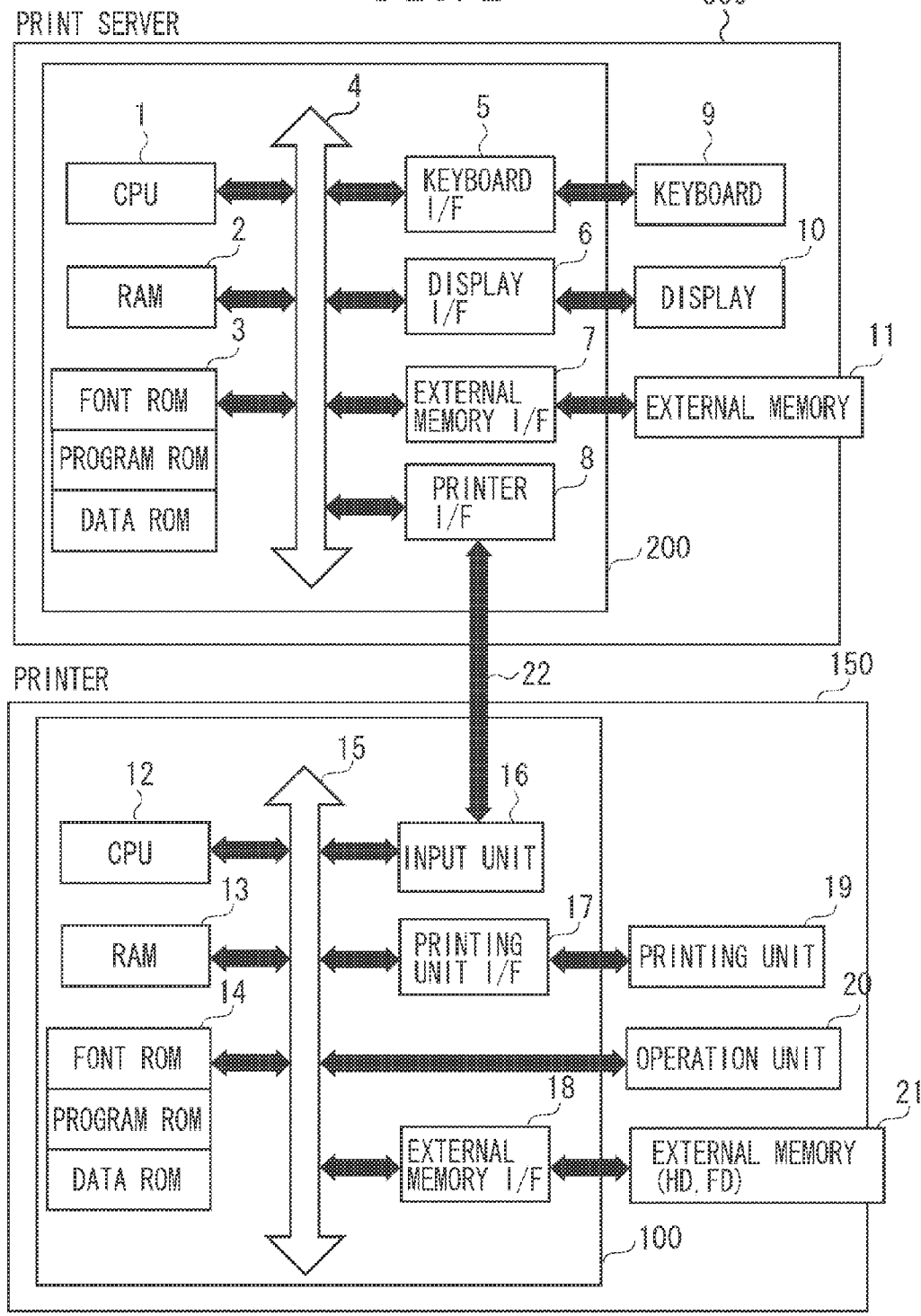
FIG. 2 illustrates an example of a hardware configuration of a print server and a printer.

FIG. 2 illustrates an example of a hardware configuration of the print server and the printer. The print server 300 that is an example of a server apparatus (information processing apparatus) includes a central processing unit (CPU) 1 for performing processing of the exemplary embodiment described below by executing processing based on a program stored in a program read-only memory (ROM) of a ROM 3 or an external memory 11. The CPU 1 controls devices connected to a system bus 4 overall by executing the program.

The program ROM of the ROM 3 or the external memory 11 stores an operating system program (OS hereinafter). A font ROM of the ROM 3 or the external memory 11 stores font data. A data ROM of the ROM 3 or the external memory 11 stores various data used for the processing described below.

A random access memory (RAM) 2 functions as a main memory or a work area for the CPU 1. A keyboard I/F 5 controls a key input from a keyboard 9 or a pointing device (not illustrated). A display I/F 6 controls displaying of a display 10. An external memory I/F 7 controls access to the external memory 11 such as a hard disk (HD) or a flexible disk (FD). The external memory 11 stores a boot program, various applications, font data, a user file, an edit file, or a printer driver.

A printer I/F 8 is connected to the printer 150 via a predetermined bidirectional interface 22 to execute communication control with the printer 150. The CPU 1 executes, for example, rasterization (processing) of an outline font on a display information RAM set on the RAM 2, thereby enabling WYSIWYG on the display 10. The CPU 1 opens various windows registered based on commands instructed by a mouse cursor (not illustrated) on the display 10, which is a cathode ray tube (CRT) to execute various data processing operations. When executing printing, a user opens a window relating to setting of printing. The user can accordingly set a print processing method (print setting information) including printer setting and selection of a print mode for the printer driver.

In the printer 150 that is an example of a printing apparatus, a CPU 12 outputs an image signal as output information to a printing unit (printer engine) 17 connected to a system bus 15 based on a control program. The control program is stored in a program ROM of a ROM 14 or an external memory 21. A font ROM of the ROM 14 stores font data used when the output information is generated. A data ROM of the ROM 14 stores information used on a host computer in the case of a printer which includes no external memory 21.

The CPU 12 can perform communication processing with the host computer via an input unit 16, and can communicate information from the printer 150 to the print server 300. A RAM 13 functions as a main memory or a work area for the CPU 12, and can increase a memory capacity by an option RAM connected to an extension port (not illustrated). The RAM 13 is used for an output information rasterization area, an environment data storage area, or a nonvolatile RAM (NVRAM). Access to the external memory 21 such as a hard disk (HD) or an integrated circuit (IC) card is controlled by a memory controller (MC) 18. The external memory 21 is connected as an option to store font data, an emulation program, or form data. An operation unit 20 includes a switch for operating an operation panel, and a light-emitting diode (LED) indicator.

At least one or more printers 150 may be provided, to which a plurality of external memories storing, in addition to a built-in font, an option font card and a program for interpreting printer control languages of different language systems, can be connected. The printer 150 may include a NVRAM (not illustrated) to store printer mode setting information from the operation unit 20.

The apparatus has been described based on the print server 300 illustrated in FIG. 2. However, a similar configuration may be employed in the case of the host computer.

Figure 3:
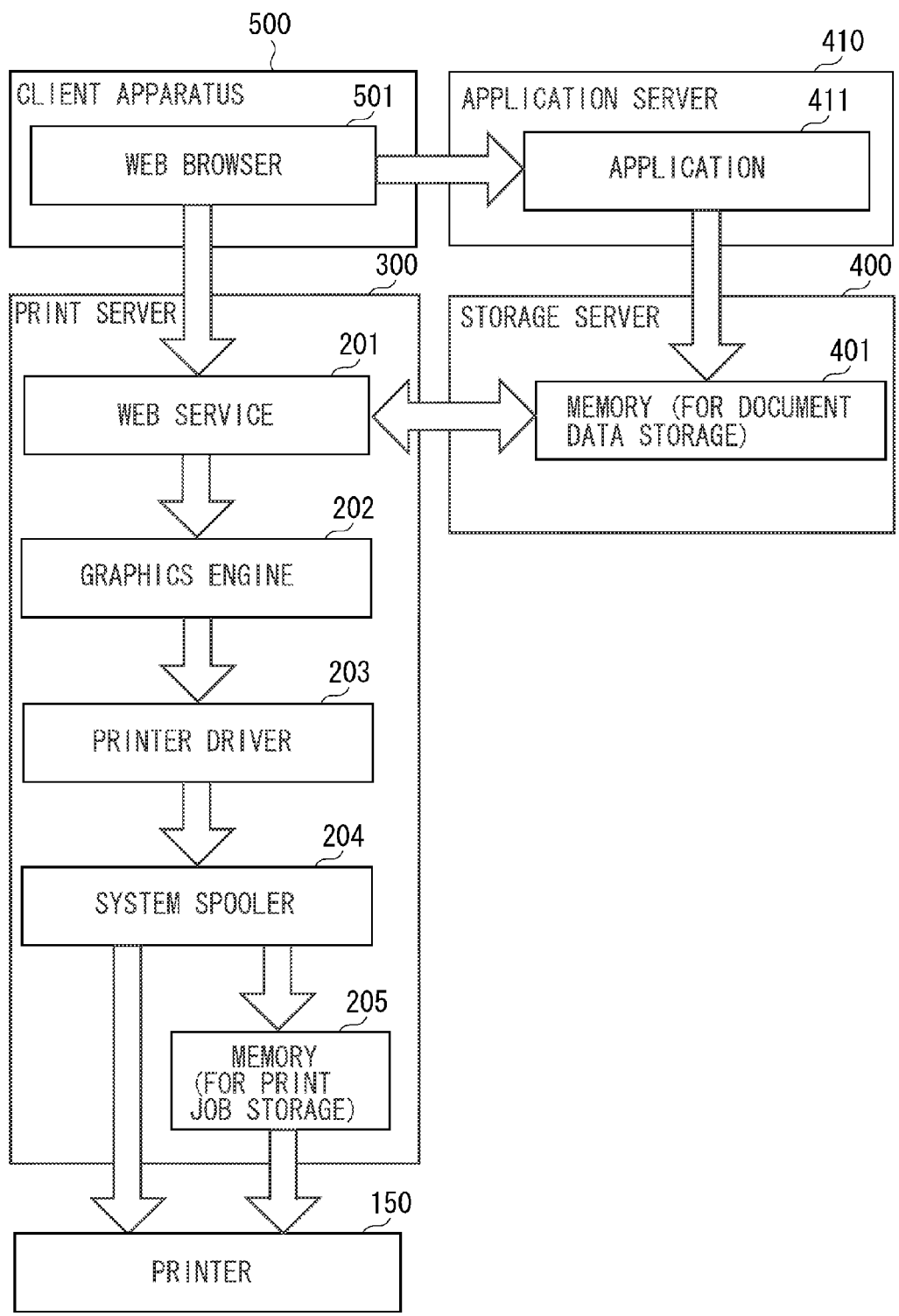
FIG. 3 illustrates examples of a hardware configuration and a software configuration of the printing system.

FIG. 3 illustrates examples of a hardware configuration and a software configuration of the printing system. A web browser 501 is installed in the client PC 500, while no printer driver for identifying a printer is installed. An application 411 is installed in the application server 410 to enable browsing and editing of document data from the web browser of the client PC 500.

The storage server 400 includes a memory 401 for storing document data generated by the application 411. In the print server 300, there are installed a web service 201 for receiving an instruction from the web browser of the client PC 500, a graphics engine 202, a printer driver 203, and a system spooler 204. These are program modules stored in the external memory 11, loaded to the RAM 2 based on an instruction from another program using an OS or its program, and executed by the CPU 1.

The web service 201 and the printer driver 203 can be added to the FD of the external memory 11, a CD-ROM (not illustrated), or the HD of the external memory 11 via a network (not illustrated). The print server 300 incorporates a memory 205 for storing drawing data of the document data, and stores and keeps the drawing data of the document data until reception of a print instruction from the printer 150.

Representative processing of print processing will hereinafter be described based on the hardware configuration and the hardware configuration relating to print processing of the printing system of FIG. 3.

The client PC 500 first generates document data by using the application 411 of the application server 410 to store the data in the memory 401 of the storage server 400. The web browser 501 displays a list of document data stored in the memory 401 via the web service 201. The client PC 500 designates document data to be printed and gives an instruction for printing based on an instruction which the user has input by using the web browser 501.

The print server 300 that has received the print instruction acquires the designated document data from the storage server 400. A printing application (not illustrated) started by the web service 201 converts the acquired document data into drawing data (e.g., EMF data) by using the graphics engine 202. The graphics engine 202 loads the printer driver 203 prepared for each printing apparatus from the external memory 11 to the RAM 2. The printer driver 203 converts the drawing data of the document data into a print job (PDL data). The converted print job is, by the OS, passed through the system spooler 204 loaded on the RAM 2, and transmitted to the printer 150 via the interface 22.

The drawing data yet to be converted into the print job by the printer driver 203 is stored in the memory 205. Based on an instruction from the printer 150, the printer driver of the printer 150 converts the drawing data into the print job to transmit it to the printer 150. The drawing data in the present invention means data such as EMF data, XPS data or PDF data yet to be converted into the print job (PDL data).

Figure 4:
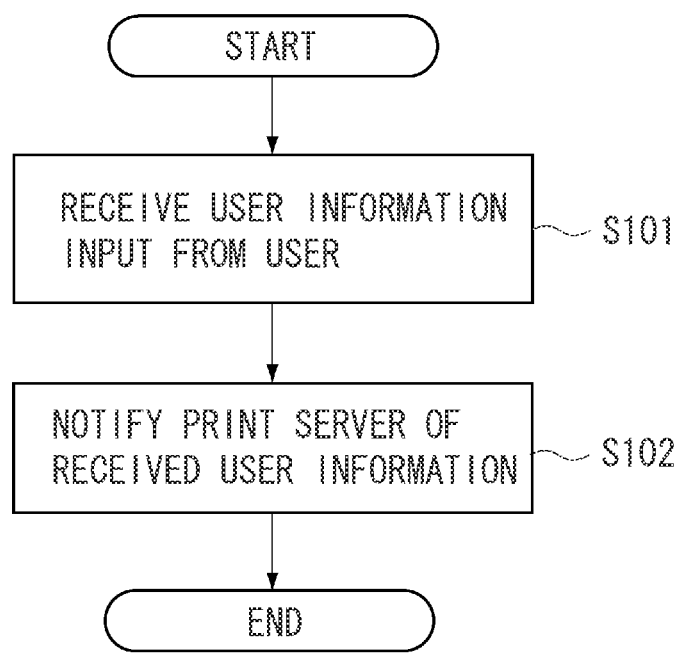
FIG. 4 is a flowchart illustrating an example of processing when a target printer receives user information.

Referring to FIG. 4, processing when user information is input before the printer 150 of the present exemplary embodiment performs printing, will be described. More specifically, FIG. 4 is a flowchart illustrating processing executed when the user goes to a printer to be used, and inputs the user information by using an operation panel of the printer. The processing of FIG. 4 is realized by reading and executing a program relating to the processing from the memory via the CPU 12 of the printer.

First, in step S101, the printer 150 receives user information (user identification information) to identify a user who has input the user information by using the operation panel. In step S102, the printer 150 notifies the print server 300 of the received user information. The user information may be input to the printer 150 by using, for example, an IC card.

Figure 5:
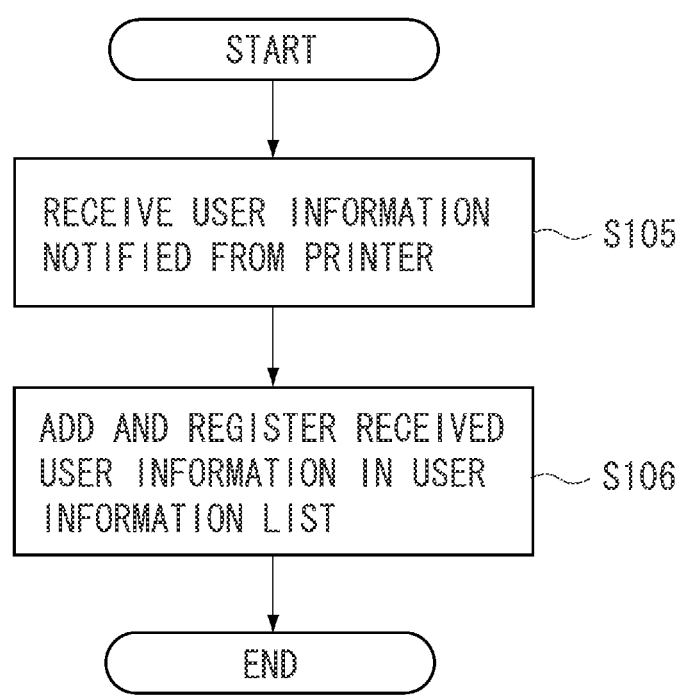
FIG. 5 is a flowchart illustrating an example of processing when the print server receives the user information.

Referring to FIG. 5, processing when the print server 300 of the present exemplary embodiment is notified of the user information from the printer 150 will be described. The processing of FIG. 5 is realized by reading and executing a program relating to the processing from the memory via the CPU 1 of the print server.

First, in step S105, the print server 300 receives the user information from the printer 150. In step S106, the print server 300 adds the received user information to a user information list which is an example of user information data. The user information data contains the user information and printing apparatus identification information (IP address or Mac address) of the printer which has transmitted the user information.

The print server 300 stores the time of receiving the user information from the printer 150 in step S105 or the time of adding the user information to the user information list in step S106 as time (date and time) of designating a target printer in the user information data.

Figure 6:
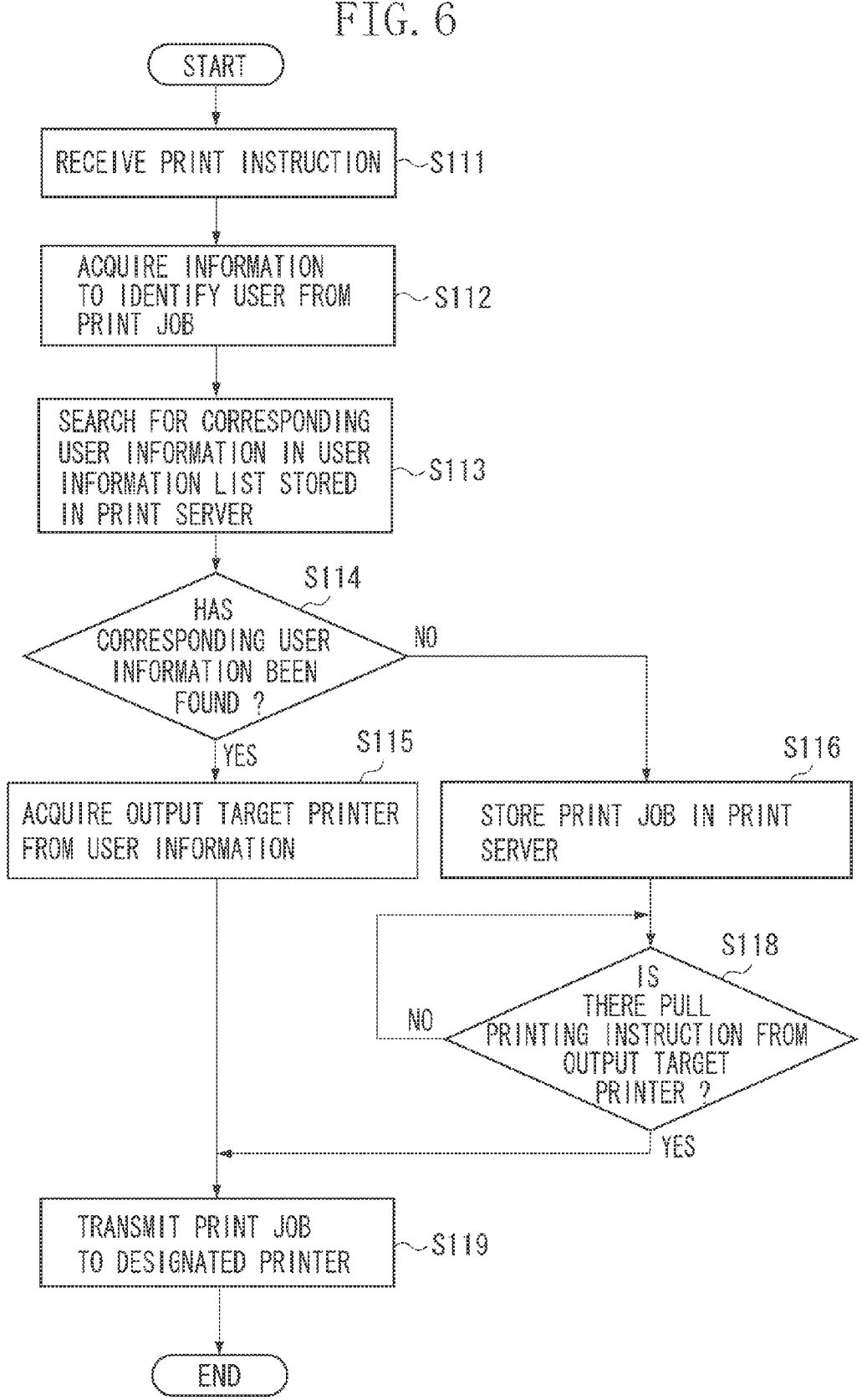
FIG. 6 is a flowchart illustrating an example of printing control according to a first exemplary embodiment.

Referring to FIG. 6, processing in the print server 300 when printing is performed according to the present exemplary embodiment will be described. The processing of FIG. 6 is realized by reading and executing a program relating to the processing via the CPU 1 of the print server.

In step S111, the print server 300 receives a print instruction from the client PC. In step S112, the print server 300 acquires user information (user identification information) to identify a user from the received print instruction. The print instruction contains the user information and information to identify document data of a printing target. A more specific example of the user information is a user account name, user ID, or user identification information acquired from an IC card owned by each user.

In step S113, the print server 300 searches for the acquired user information in the user information list stored in the server. If corresponding user information is found (YES in step S114), in step S115, the print server 300 acquires the corresponding user information and information of a target printer (printing apparatus identification information) contained in the user information data. In step S119, the print server 300 transmits a print job of the document data designated in the print instruction to a transmission destination identified by the information of the target printer. A more specific example of the information of the target printer is a printer IP address or a Mac address.

In this case, the print server 300 generates a print job by using a printer driver corresponding to the printer of the identified transmission destination. The printer driver may be installed before or after the printing apparatus of the transmission destination is identified.

If no corresponding user information is found (NO in step S114), in step S116, the print server 300 stores and keeps drawing data generated based on the print instruction. In step S118, the print server 300 determines whether an instruction of pull-printing for the stored drawing data has been received from the printer. The pull-printing means processing of printing the drawing data stored in the information processing apparatus (print server in the present exemplary embodiment) based on an instruction from the printer. Thus, the print server 300 determines that an instruction of pull-printing has been received when it receives information designating the document data from the printing apparatus. In step S119, upon determination that the instruction of pull-printing has been received, the print server 300 converts the drawing data of the document designated by the instruction of pull-printing into a print job, and transmits the print job to the target printer to which the instruction of pull-printing has been input.

The instruction of pull-printing contains information designating a document (drawing data) to be printed and a printer IP address. Thus, the print server 300 can transmit a print job of the designated document to the printer which has instructed the pull-printing. In the present exemplary embodiment, the print server 300 generates, after reception of the instruction of pull-printing, a print job from the drawing data of the designated document by using the printer driver of the printer which has issued the instruction of pull-printing.

To perform processing based on the flowchart of FIG. 6, if there is user information input to the printer by the user before the client PC 500 issues a print instruction to the print server 300, printing is executed at the printer to which the user information has been input. On the other hand, if there is no user information input to the printer by the user before issuance of a print instruction, the print server 300 stores and keeps drawing data of document data identified by the print instruction received from the client PC 500. After reception of an instruction of pull-printing from the printer, the print server 300 generates a print job from drawing data of a document identified by the instruction of pull-printing, and outputs the print job to the printer which has input the instruction of pull-printing.

More specifically, according to the present exemplary embodiment, the user goes to the printer before the client PC issues a print instruction, inputs user information, and then issues the print instruction by using the client PC. Thus, the user has no trouble finding a position of the printer which performs printing. Even when the user does not go to the printer to input user information before the client PC issues a print instruction, drawing data of a printing target document is stored in the print server 300. Then, a result (print product) of a print job is output based on an instruction of pull-printing. Thus, irrespective of whether there is any user information input to the printer before the client PC issues a print instruction, the user never loses a print product.

In the first exemplary embodiment, if there is stored in the user information list user information corresponding to the user information contained in the print instruction to identify the user, the print server 300 unconditionally transmits the print job to the printer. However, for example, there is a possibility that while the user has input user information so as to output it to the printer, the user may forget having designated (input the user information) the printer. There is also a possibility that a printer to which the user has input user information may be a printer designated during previous printing, and no printer is designated during current printing. More specifically, a case may occur where while the user has understood storage in the print server 300, the user information input in the past remains in the print server 300, and hence printing is executed by a printer unintended by the user.

Figure 7:
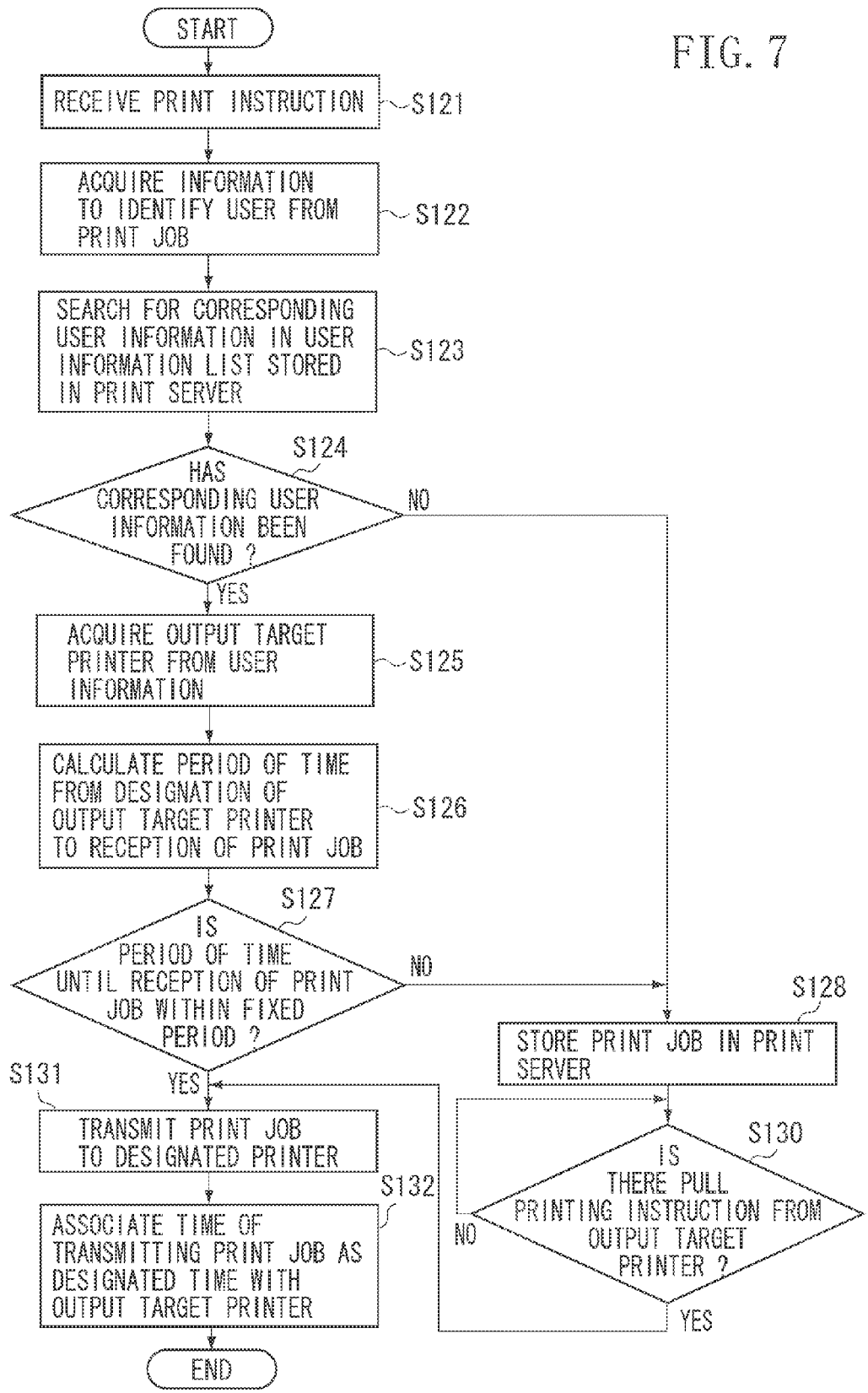
FIG. 7 is a flowchart illustrating an example of printing control according to a second exemplary embodiment.

Referring to a flowchart of FIG. 7, processing to solve the abovementioned problems will be described. Differences of a second exemplary embodiment from the first exemplary embodiment will be described in detail. The processing of FIG. 7 is realized by reading and executing a program relating to the processing from a memory via a CPU 1 of a print server.

Processing of steps S121 to S125 is similar to that of steps S111 to S115 of the first exemplary embodiment, and thus description thereof is omitted.

In step S126, the print server 300 acquires time of designation of a target printer from user information data, and calculates a period of time from the designation of the target printer to reception of a print instruction based on the acquirement time and reception time of the print instruction. In step S127, the print server 300 determines whether the period of time calculated in step S126 is within a fixed period (predetermined period). If the period of time calculated in step S126 is within the fixed period (YES in step S127), in step S131, the print server 300 transmits a print job to the designated target printer.

If the period of time calculated in step S126 is longer than the fixed period (NO in step S127), in step S128, the print server 300 stores and keeps drawing data therein without transmitting any print job to the designated target printer. Processing from the storage of step S128 to pull-printing of step S130 is similar to that of steps S116 to S118 of the first exemplary embodiment, and thus description thereof is omitted.

In step S132, the print server 300 updates the time of designating the target printer contained in the user information data based on the time of transmitting the print job to the target printer.

FIG. 8 illustrates an example of a correspondence table between a period from the time when the user goes to the printer to input user information to the output printer by using the operation panel of the printer (designating target printer), until the time of inputting a print instruction and determination of an output destination in the second exemplary embodiment. In the example of FIG. 8, the print server 300 transmits, if the user issues a print instruction within 20 minutes after the same user has designated a target printer, a print job to the target printer.

If the user issues a print instruction after 20 minutes or more from the designation of the target printer, the print server 300 stores and keeps drawing data of a document even if user information contained in the print instruction is included in the user information list. This correspondence table is registered in, for example, the external memory 11 of the print server 300, and changed by user's operation when necessary (not illustrate).

To perform processing based on the flowchart of FIG. 7, drawing data of a printing target is stored and kept in the print server 300 without any output to a target printer with old date and time which is designated, and a print job is transmitted after the user gives an instruction for pull-printing. Thus, a problem of execution of printing at a printer unintended by the user can be prevented.

In the second exemplary embodiment, the print server 300 calculates a passage of time based on the time of designation of the target printer and the reception time of the print instruction. The print server 300 transmits a print job to the target printer if the date and time of designating the target printer is determined to be new. If the time is determined to be old, the printer server 300 stores and keeps the drawing data of the document of the printing target therein.

In the processing of the second exemplary embodiment, however, even if the target printer has been designated, when a fixed period of time elapses after the designation, the drawing data is automatically stored and kept in the print server 300. Thus, even when a great volume of print products is output to the target printer, if the fixed period of time elapses after the designation of the target printer, the drawing data is stored in the print server 300. In order to print the drawing data, the user must gives an instruction for the printer to perform pull-printing. As a result, printing is started after the output printer is designated, and hence the user must stay at the printer until the printing is completed. This processing is not efficient.

Figure 9:
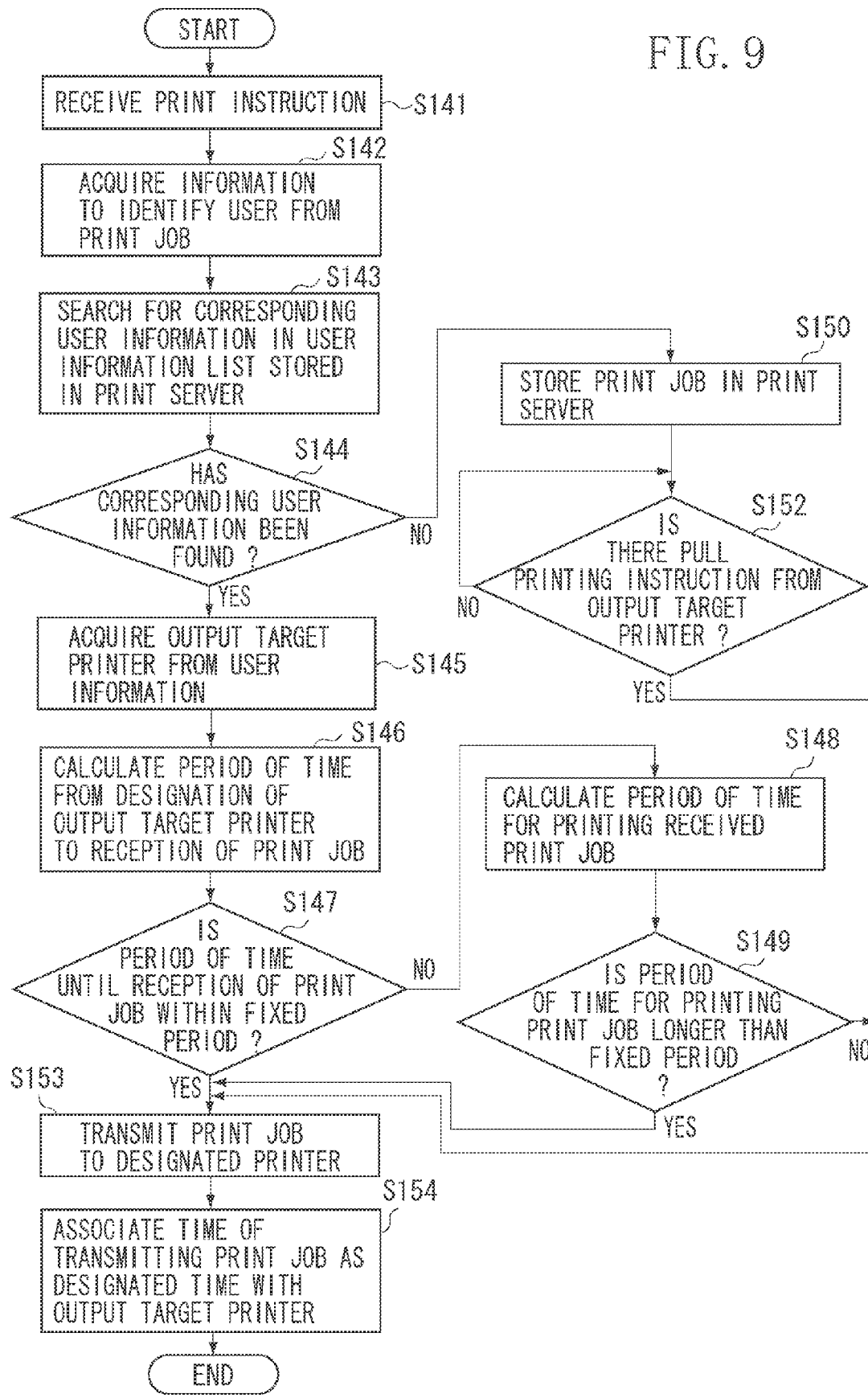
FIG. 9 is a flowchart illustrating an example of printing control according to a third exemplary embodiment.

Thus, in a third exemplary embodiment, referring to a flowchart of FIG. 9, processing to solve the abovementioned problem will be described. Differences of the present exemplary embodiment from the first and second exemplary embodiments will be described. The processing of FIG. 9 is realized by reading and executing a program relating to the processing via a CPU 1 of a printer server.

Processing of steps S141 to S147 is similar to that of steps S121 to S127 of the second exemplary embodiment, and thus description thereof is omitted.

If a period of time from designation of a target printer to reception of a print instruction is not within a fixed period (NO in step S147), in step S148, the print server 300 calculates a period of time necessary for printing of a print job generated based on the received print instruction. For example, the print server 300 calculates a period of time for the printing by adding a command indicated by PDL which is a print job, while using a table. The print server 300 may store capability information of each printer, and calculate a period of time for the printing based on capability information of a printer corresponding to information of the target printer acquired in step S145 and the print job.

In step S149, the print server 300 determines whether a printing period of time necessary for printing of a print job is longer than a fixed period of time. If the printing period of time for printing of the print job is longer than the fixed period (YES in step S149), in step S153, the print server 300 transmits the print job to a target printer.

On the other hand, if the printing period of time for printing of the print job is shorter than the fixed period (NO in step S149), in step S150, the print server 300 stores and keeps (temporarily stores) drawing data before generation of the print job until it receives an instruction of pull-printing. Processing of steps S151 to S154 is similar to that of steps S128 to S132 of the second exemplary embodiment, and thus description thereof is omitted. In the present exemplary embodiment, a print job of the drawing data is generated while the drawing data before the generation of the print job is being held.

FIG. 10 illustrates an example of a correspondence table between a period of time from designation of a target printer to reception of a print instruction and output destination determination in the third exemplary embodiment. In the example of FIG. 10, if a period of time for printing is within 10 minutes, when a print instruction is received within 60 minutes after the designation of the target printer, the print server 300 transmits a print job generated based on the print instruction to the target printer. In other words, an instruction of pull-printing is unnecessary. This correspondence table is registered in, for example, the external memory 11 of the print server 300, and can be changed by user's operation when necessary (not illustrated).

To perform processing based on the flowchart of FIG. 9, even in the case of a target printer of an old date and time which is designated, a print job that takes a long printing period is transmitted to the target printer without being stored and kept in the print server 300. The print job that takes the long printing period is directly transmitted to the target printer, and hence a waiting time for printing can be shortened more than when the user goes to the printer to perform pull-printing.

Figure 11A:
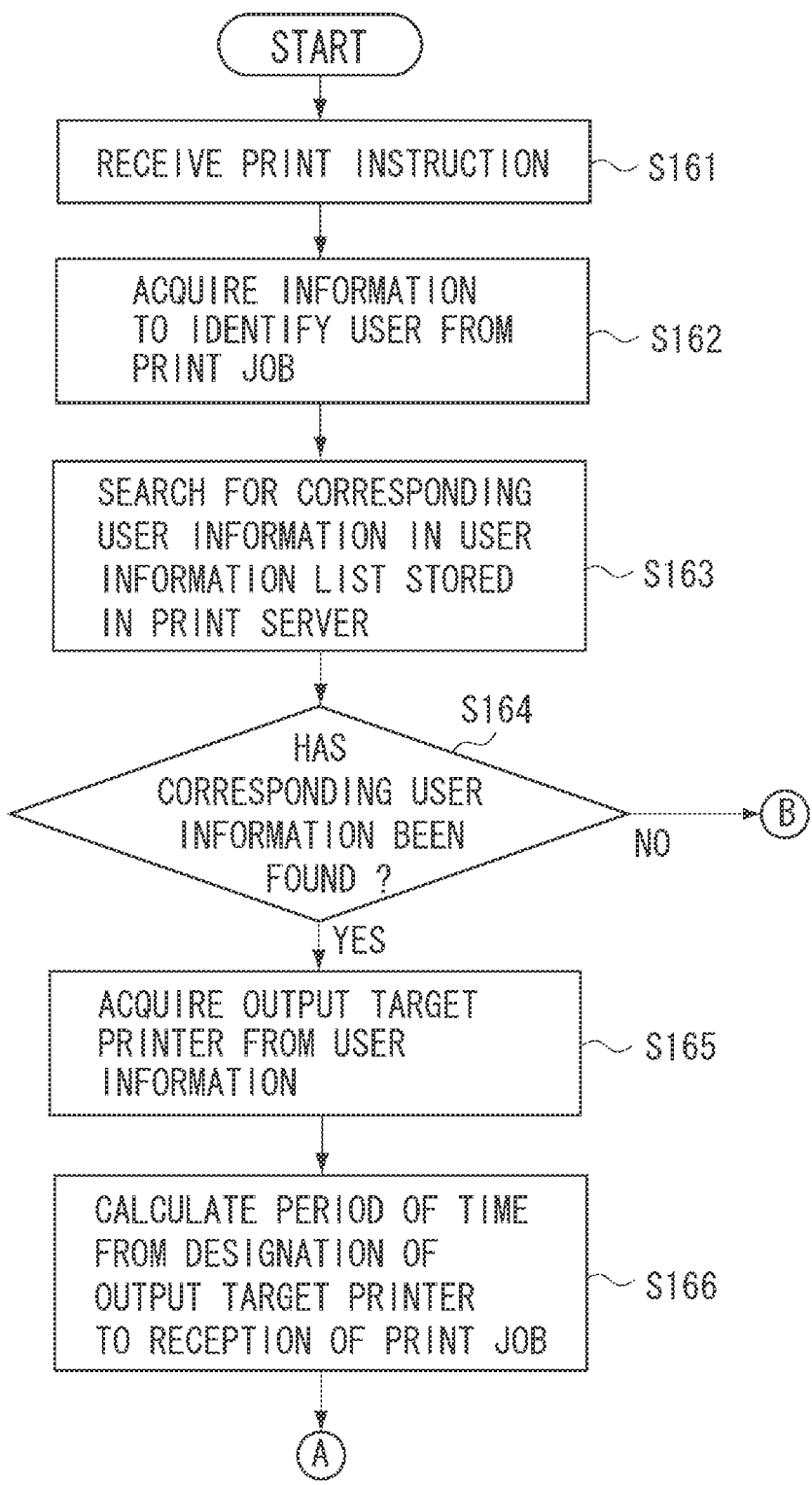
FIG. 11 is a flowchart illustrating an example of printing control according to a fourth exemplary embodiment.

In a fourth exemplary embodiment, referring to a flowchart of FIG. 11, determination processing of a print server 300 whether a print job is to be transmitted to a target printer or stored and kept in the server according to a security level, will be described. Differences of the present exemplary embodiment from the first to third exemplary embodiments will be described. The processing of FIG. 11 is realized by reading and executing a program relating to the processing via a CPU 1 of the print server.

Processing of steps S161 to S169 is similar to that of steps S141 to S149, and thus description thereof will be omitted.

In step S170, the print server 300 acquires security information set in a received print instruction (security information acquisition). For example, when a print job generated based on the print instruction contains data relating to copy-forgery-inhibited pattern printing or data relating to a stamp which limits browsing of confidential data, the print server 300 may set a security level of the security information to be high.

In step S171, the print server 300 determines whether the security level of the acquired security information is lower than a fixed level. If the security level of the acquired security information is lower than the fixed level (YES in step S171), in step S175, the print server 300 transmits the print job to the target printer. If the security level is higher than the fixed level (NO in step S171), the print server 300 temporarily stores and keeps drawing data before the generation of the print job until pull-printing.

Processing of steps S172 to S176 is similar to that of steps S151 to S154 of the third exemplary embodiment, and thus description thereof is omitted.

FIG. 12 illustrates an example of a correspondence table showing time from designation of a security level and a target printer, to reception of a print instruction for determining output destination. In the example of FIG. 12, the print server 300 transmits a print job determined to be high in security level to a target printer only when a print instruction is received within 5 minutes after designation of the target printer. In other words, an instruction of pull-printing is unnecessary.

Thereafter, the print server 300 stores the print job, and transmits the print job to the printer when an instruction of pull-printing is received. This correspondence table is registered in, for example, the external memory 11 of the print server 300, and can be changed by user's operation when necessary (not illustrated).

To perform processing based on the flowchart of FIG. 11, in the case of a document high in security level, the print job is transmitted only to a printer whose designation is highly likely to be recognized by the user. When the target printer is located far from a place where printing has been executed, and a period of time from outputting of the print job to fetching is long, others can be prevented from seeing the print job.

Figure 13A:
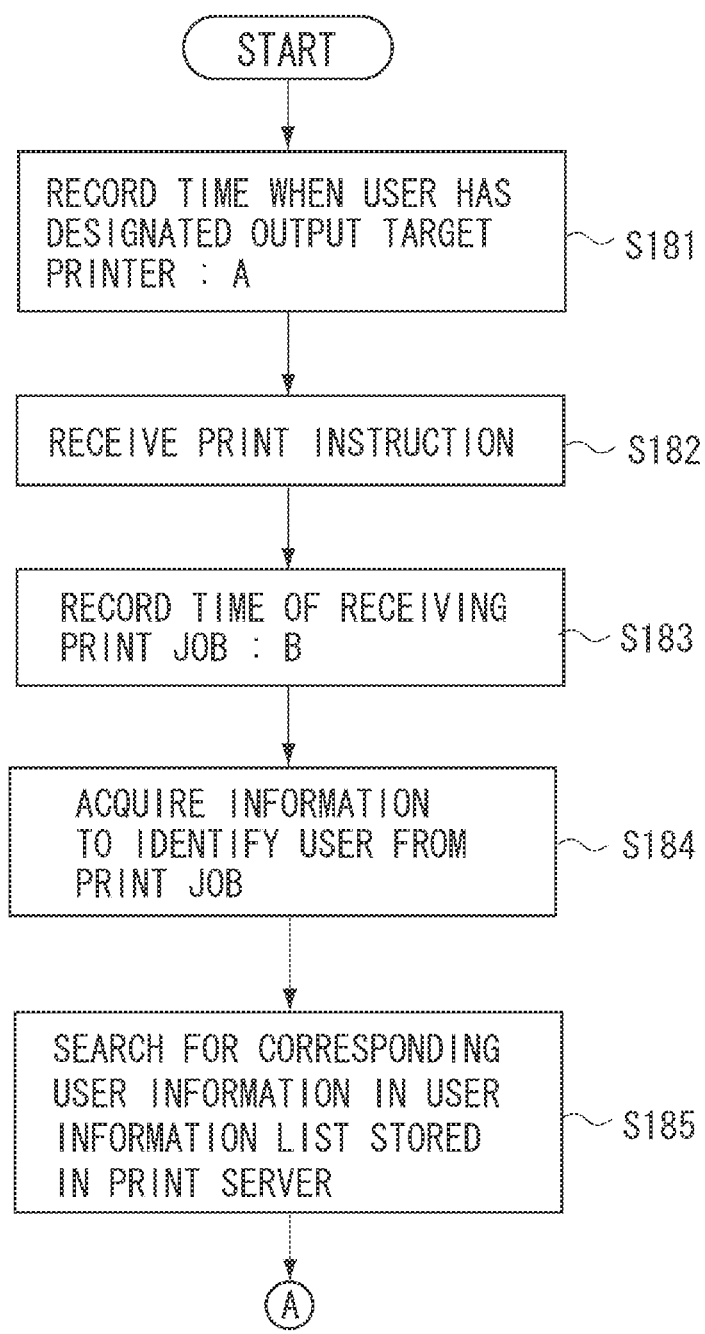
FIG. 13 is a flowchart illustrating an example of printing control according to a fifth exemplary embodiment.
Figure 13B:
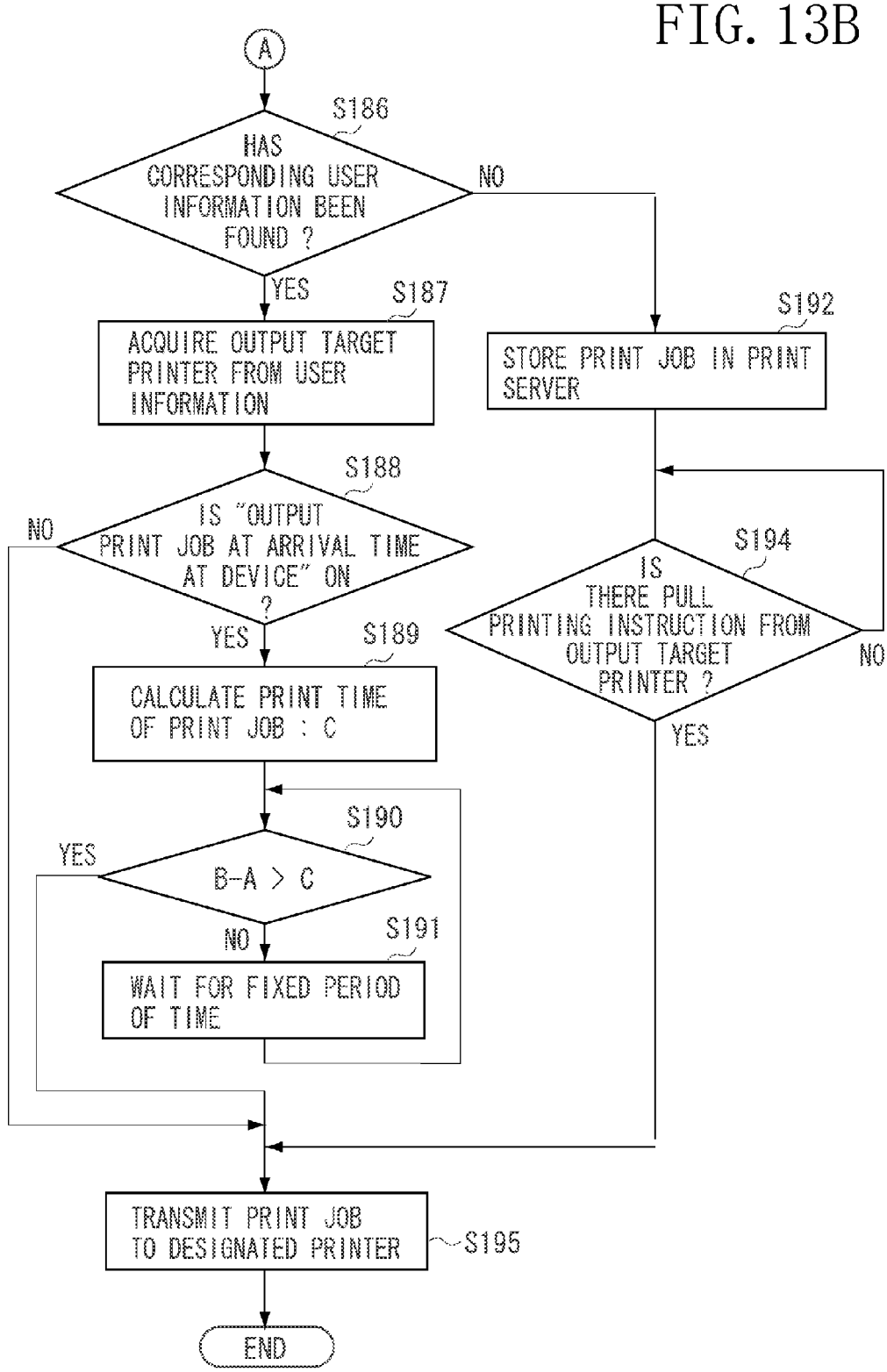

In a fifth exemplary embodiment, by using information about a period of time from user's designation of a target printer to issuance of a print instruction, a print job is transmitted to the target printer according to the time when the user arrives at the target printer. Referring to FIG. 13, this processing will be described. Differences of the present exemplary embodiment from the first to fourth exemplary embodiments will be described. The processing of FIG. 13 is realized by reading and executing a program relating to the processing via a CPU 1 of a print server.

FIG. 14 illustrates an example of a user interface (UI) of a printer driver. In check box setting of UI's "output print job at arrival time at device", the user can switch ON/OFF processing of "output print job at arrival time at device".

Referring back to FIG. 13, in step S181, the print 300 records the time of designating a target printer. The print server 300 stores the time of receiving the user information from the target printer 150 in step S105 or the time of adding the user information to the user information list in step S106 as the time of designating the target printer in user information data.

In step S182, the print server 300 receives a print instruction. In step S183, the print server 300 records time of receiving the print instruction. Processing of subsequent steps S184 to S187 is similar to that of steps S162 to S165 of the fourth exemplary embodiment, and thus description thereof will be omitted. If setting of "output print job at arrival time at device" is ON (YES in step S188), in step S189, the print server 300 calculates a period of time for printing of the received print job.

The print server 300 calculates a difference between the time of designating the target printer and the time of receiving the print instruction. If the difference is larger than the period of time for printing of the print job (YES In step S190), in step S195, the print server 300 transmits the print job to the target printer. If the difference is smaller than the period of time for printing of the print job (NO in step S190), in step S191, the print server 300 waits for a fixed period of time, and repeats the processing until the difference exceeds the period of time for printing of the print job.

To perform processing based on the flowchart of FIG. 13, a period of time from designation of a target printer to time of receiving a print instruction and a period of time from printing to time of arriving at the target printer are assumed to be approximately equal to each other. A print job can be output at user's arrival time at the target printer.

Thus, when a document which should not to be seen by others is printed, printing can be completed by calculating exact arrival time at the printer.

The foregoing exemplary embodiments of the present invention are directed to the printing system configured as illustrated in FIG. 1. However, processing of the present invention can be applied even to a printing system which includes a client PC and a printer.

In this case, the client PC serves as the print server 300 of FIG. 1. More specifically, the client PC stores a program relating to printer drivers for printers 150 to B 152. The client PC stores the program relating to the printer drivers. However, these printer drivers are yet to be installed. The client PC includes a printer driver which can provide a setting screen but cannot generate a print job. The client PC receives print setting information and a print instruction to generate a print job via the setting screen (steps S111 and S112 of FIG. 6).

If the user has input user information to the printer before reception of the print instruction, the client PC installs a printer driver corresponding to the printer to which the user information has been input. Then, the client PC generates a print job for document data by using the installed printer driver, and transmits the print job to the printer to which the user has input the user information. If the user has not input user information before reception of the print instruction, the client PC stores and keeps drawing data of a printing target document, installs a printer driver according to an instruction of pull-printing, and generates a print job.

Through the above processing, even in the case of the printing system which includes the client PC and the printer but no print server, the client PC can realize processing of the present invention.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-178003 filed Jul. 30, 2009, which is hereby incorporated by reference herein in its entirety.

What is claimed is:

1. An information processing apparatus comprising:
a reception unit configured to receive user information from a printing apparatus before a print instruction for printing document data is received;
a storage unit configured to store the user information in an associated manner with the printing apparatus;
a determination unit configured to determine whether user information which is identified from the print instruction is stored by the storage unit; and
a transmission unit configured to transmit, when the determination unit determines that the user information which is identified from the print instruction is stored by the storage unit, a print job to be generated based on the print instruction to the printing apparatus being associated with the user information identified from the print instruction,
wherein when a period of time elapsed from time of a notification of the user information from the printing apparatus to time of reception of the print instruction from a client apparatus is longer than a first predetermined period of time, if the determination unit determines that the user information identified from the print instruction is stored by the storage unit, the storage unit stores drawing data based on the print instruction.

2. The information processing apparatus according to claim 1, wherein the storage unit stores, when the determination unit determines that the user information which is identified from the print instruction is not stored by the storage unit, the drawing data which is generated based on the print instruction.

3. The information processing apparatus according to claim 1, further comprising a calculation unit configured to calculate a printing period of time for the print job,
wherein when the printing period of time calculated for the print job by the calculation unit is longer than a second predetermined period of time, if the period of time is longer than the first predetermined period of time, the transmission unit transmits the print job.

4. The information processing apparatus according to claim 1, further comprising a security information acquisition unit configured to acquire security information of the print job,
wherein when a security level of the security information acquired by the security information acquisition unit satisfies a predetermined condition, the transmission unit transmits the print job.

5. An information processing method, executed by an information processing apparatus, comprising:
receiving user information from a printing apparatus before a print instruction for printing document data is received;
storing the user information in an associated manner with the printing apparatus;
determining whether user information which is identified from the print instruction is stored by the storage unit; and
transmitting, when the user information which is identified from the print instruction is determined to be stored by the storage unit, a print job to be generated based on the print instruction to the printing apparatus being associated with the user information identified from the print instruction,
wherein when a period of time elapsed from time of a notification of the user information from the printing apparatus to time of reception of the print instruction from a client apparatus is longer than a first predetermined period of time, if the user information identified from the print instruction is determined to be stored by the storage unit, the storage step stores drawing data based on the print instruction.

6. A non-transitory computer-readable storage medium storing computer-executable instructions which when loaded into a computer and executed perform an information processing method for causing a computer to function as information processing apparatus, the information processing apparatus comprising:
a reception unit configured to receive user information from a printing apparatus before a print instruction for printing document data is received;
a storage unit configured to store the user information in an associated manner with the printing apparatus;
a determination unit configured to determine whether user information which is identified from the print instruction is stored by the storage unit; and
a transmission unit configured to transmit, when the determination unit determines that the user information which is identified from the print instruction is stored by the storage unit, a print job to be generated based on the print instruction to the printing apparatus being associated with the user information identified from the print instruction,
wherein when a period of time elapsed from time of a notification of the user information from the printing apparatus to time of reception of the print instruction from a client apparatus is longer than a first predetermined period of time, if the user information identified from the print instruction is determined to be stored by the storage unit, the storage unit stores drawing data based on the print instruction.

7. The information processing method according to claim 5, further comprising storing, when the determination unit determines that the user information which is identified from the print instruction is not stored by the storage unit, the drawing data which is generated based on the print instruction.

8. The information processing method according to claim 5, further comprising calculating a printing period of time for the print job,
wherein when the printing period of time calculated for the print job is longer than a second predetermined period of time, if the period of time is longer than the first predetermined period of time, the print job is transmitted.

9. The information processing method according to claim 5, further comprising acquiring security information of the print job,
wherein when a security level of the security information satisfies a predetermined condition, the print job is transmitted.

10. The computer-readable storage medium according to claim 6, wherein the storage unit stores, when the determination unit determines that the user information which is identified from the print instruction is not stored by the storage unit, the drawing data which is generated based on the print instruction.

11. The computer-readable storage medium according to claim 6, further comprising a calculation unit configured to calculate a printing period of time for the print job,
   wherein when the printing period of time calculated for the print job by the calculation unit is longer than a second predetermined period of time, if the period of time is longer than the first predetermined period of time, the transmission unit transmits the print job.

12. The computer-readable storage medium according to claim 6, further comprising a security information acquisition unit configured to acquire security information of the print job,
   wherein when a security level of the security information acquired by the security information acquisition unit satisfies a predetermined condition, the transmission unit transmits the print job.

* * * * *